(12) United States Patent
Stanush et al.

(10) Patent No.: US 6,795,552 B1
(45) Date of Patent: Sep. 21, 2004

(54) ENHANCED SERVICES NETWORK INTERFACE DEVICE

(75) Inventors: Andrew G. Stanush, Blue Mound, TX (US); Michael K. James, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/460,790

(22) Filed: Dec. 14, 1999

(51) Int. Cl.[7] .............................................. H04M 1/00
(52) U.S. Cl. ........................... 379/413.01; 379/399.01
(58) Field of Search ...................... 379/399.01, 413.01, 379/413.02, 413.03, 413.04, 414, 402, 413, 93.05

(56) References Cited

U.S. PATENT DOCUMENTS

| | | | |
|---|---|---|---|
| 4,488,008 A | 12/1984 | Dellinger et al. | 179/81 R |
| 4,562,311 A | 12/1985 | Dola | 179/158 R |
| 4,741,032 A | 4/1988 | Hampton | 379/399 |
| 4,749,359 A | 6/1988 | White | 439/133 |
| 4,800,588 A | 1/1989 | Poster, Jr. | 379/412 |
| 4,827,504 A | 5/1989 | Collins et al. | 379/399 |
| D304,339 S | 10/1989 | Collins et al. | D14/240 |
| 4,882,647 A | 11/1989 | Collins | 361/119 |
| 4,910,770 A | 3/1990 | Collins et al. | 379/399 |
| D314,759 S | 2/1991 | Collins et al. | D13/184 |
| 5,313,519 A | 5/1994 | Mickelson et al. | 379/399 |
| 5,355,408 A | 10/1994 | Lanquist et al. | 379/399 |
| 5,357,565 A | 10/1994 | Butler, III et al. | 379/412 |
| 5,359,654 A | 10/1994 | Jensen et al. | 379/397 |
| 5,414,765 A | 5/1995 | Lanquist et al. | 379/399 |
| 5,416,837 A | 5/1995 | Cote et al. | 379/399 |
| 5,420,920 A | 5/1995 | Capper et al. | 379/399 |
| 5,479,505 A | 12/1995 | Butler et al. | 379/412 |
| 5,515,435 A | 5/1996 | DeBalko et al. | 379/399 |
| 5,570,422 A | 10/1996 | Napiorkowski et al. | 379/399 |
| 5,600,716 A | 2/1997 | Broome et al. | 379/399 |
| 5,623,542 A | 4/1997 | Schneider et al. | 379/399 |
| 5,625,686 A | 4/1997 | Capper et al. | 379/399 |
| 5,671,273 A | 9/1997 | Lanquist | 379/399 |
| 5,703,944 A | 12/1997 | DeBalko | 379/399 |
| 5,726,851 A | 3/1998 | Knapp | 361/104 |
| 5,751,789 A | 5/1998 | Farris et al. | 379/34 |
| 5,778,122 A | 7/1998 | Giebel et al. | 385/55 |
| 5,802,170 A | 9/1998 | Smith et al. | 379/412 |
| 5,888,079 A | 3/1999 | Norden | 439/142 |
| 5,888,085 A | 3/1999 | Meyerhoefer et al. | 439/188 |
| 5,901,220 A | 5/1999 | Garver et al. | 379/399 |
| 5,914,846 A | 6/1999 | Smith et al. | 361/119 |
| 5,974,139 A | 10/1999 | McNamara et al. | 379/399 |

FOREIGN PATENT DOCUMENTS

| | | | | |
|---|---|---|---|---|
| EP | 0966147 A2 | 12/1999 | | H04M/11/06 |
| WO | WO98/59482 | 6/1997 | | H04M/1/00 |

Primary Examiner—Rexford Barnie
(74) Attorney, Agent, or Firm—Christopher C. Dremann

(57) ABSTRACT

A network interface device includes an enclosure that houses active electronics for accommodating twisted-pair telephone wires and coaxial cable. The housing has a base that connects to a building wall. A shield locates within the housing, the shield having a platform and a perimeter wall that extends around the platform. A printed circuit board mounts within the shield between the base and the platform. The shield is hinged to the base so that it may be readily removed with the printed circuit board if repair is needed. A subscriber bridge module mounts on the platform. The subscriber bridge module has subscriber line termination points on one side that electrically connect with the subscriber lines. The subscriber bridge module also has telephone jacks electrically connected between the subscriber termination points and the provider line. This provides a demarcation between the subscriber lines and the provider line. An inner cover encloses a provider line port, any voltage protecting devices mounted on the platform, and power terminals on the subscriber bridge module.

22 Claims, 4 Drawing Sheets

ENHANCED SERVICES NETWORK INTERFACE DEVICE

BACKGROUND

This invention relates in general to a network interface device that connects between telephone subscriber premise wiring and a provider line, and in particular to a network interface device that includes active electronics for controlling and routing various signals from a coaxial provider cable.

A telephone network interface device ("NID") has electrical connectors and protective devices located in a housing that mounts to a subscriber's or user's premises. The NID connects a subscriber wiring to provider cables, e.g. from a telephone company or cable company. Typically, the housing has two sections, a provider portion and a subscriber portion. The provider cable enters through the provider portion. The provider portion also contains protective devices to protect equipment and users from excess voltage. The subscriber wiring enters from the subscriber's side. A subscriber bridge module locates between the two sides. The bridge module has one or more subscriber line terminal blocks electrically connected with the subscriber lines in the building. The bridge module also has a telephone jack electrically connected with the subscriber line terminal block. The telephone jack is connected to the provider line for providing a demarcation between the subscriber line and the provider line. This allows a user to insert a conventional telephone plug leading to a receiver to directly test whether the provider line is operating.

Typically, the jack has a switch within it that connects the provider line with the subscriber line terminal. In one type, a passive plug mounted to a door closes the switch to make the connection when the door is closed. When the door is opened, the plug moves from the telephone jack, and the connection between the provider line and subscriber line breaks. In another type, the switch in the telephone jack is normally closed. Inserting a telephone plug of a telephone receiver opens the switch.

Typically, the telephone company or provider wiring comprises twisted pairs of wires. Also, the subscriber wiring comprises twisted pairs of wiring. Some NIDs have provisions for accommodating coaxial wiring, as well. In coaxial wiring, a central conductor is surrounded by a shield. More recently, electronic circuits have been developed that will receive several signals on a single coaxial cable from the provider. The electronic circuit separates various signals from the coaxial cable into a variety of outputs, such as voice, internet access, and cable television. This circuitry is contained in a printed circuit board, which in the prior art is mounted in the back of the enclosure or housing of the NID. In order to gain access to the PC board, the entire housing must be removed from the building or dwelling. This can be time consuming.

SUMMARY OF THE INVENTION

The network interface device of this invention includes a housing or enclosure that has a base that is adapted to be connected to a dwelling or building wall. An outer cover that provides protection for the termination points and protective devices is hinged to the base and moves between open and closed positions. A partition or shield is located within the housing. The shield has a forward wall or platform and a perimeter wall that extends around and rearward from the platform to define a cavity between the base and the platform for mounting a printed circuit board. The printed circuit board mounted in the cavity contains active electronics for controlling and routing telecommunication signals between a coaxial and/or copper cable, including twisted-pairs, and various subscriber lines leading to equipment within the dwelling. The shield is preferably hinged to the base to allow access to the PC board. This allows the PC board to be replaced without having to remove the base from the building wall.

A provider line port is located in the platform for connecting the coaxial provider line to the printed circuit board. A hinged inner cover mounts to the platform over the provider line port for blocking access to the provider line port while in a closed position. A subscriber bridge module is mounted on the platform for providing a demarcation between the subscriber lines and the provider line. Subscriber line terminal blocks on the bridge module are adapted to be electrically connected with the subscriber lines in the building. The bridge module also has a plurality of telephone jacks adapted to be connected to the provider line and electrically connected to the subscriber line terminal blocks. The telephone jacks and the terminal blocks are positioned outside of the inner cover while the inner cover is in the closed position.

Preferably, the telephone jacks have normally closed switches connected to a circuit that maintains the provider lines connected to the subscriber lines. When a plug of a telephone receiver is inserted into the telephone jack, the switch opens, connecting the telephone receiver to the provider line. For safety, a passive plug is tethered to the subscriber bridge module. The safety plug may be inserted into the telephone jack to open the switch to prevent voltage from possibly occurring on the subscriber line terminal block, such as when the user may be connecting subscriber lines to the subscriber line terminal block.

DETAILED DESCRIPTION OF THE INVENTION

Figure 1:
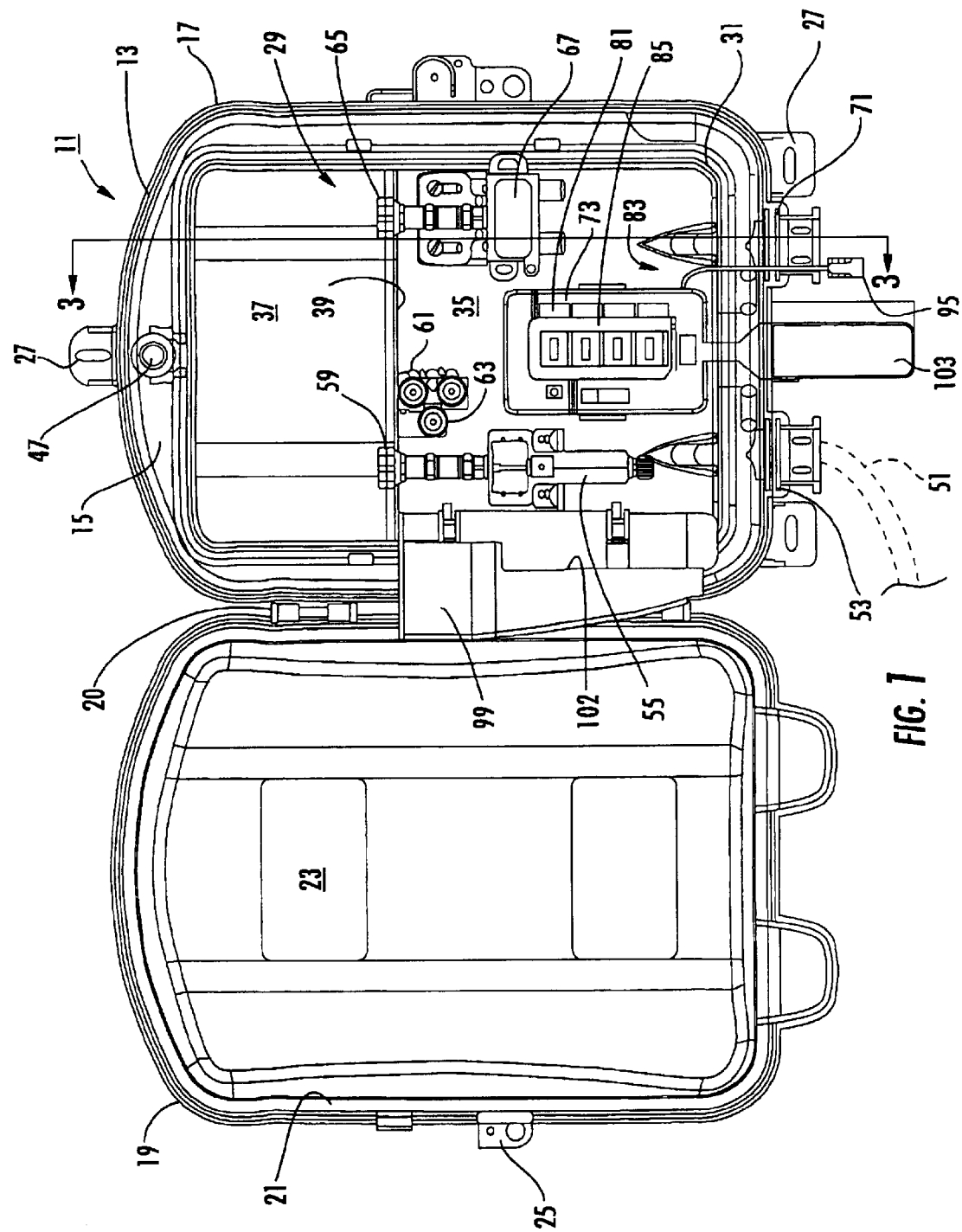
FIG. 1 is a front elevational view of a network interface device constructed in accordance with this invention and shown with the outer cover, inner cover and subscriber bridge module door open.
Figure 2:
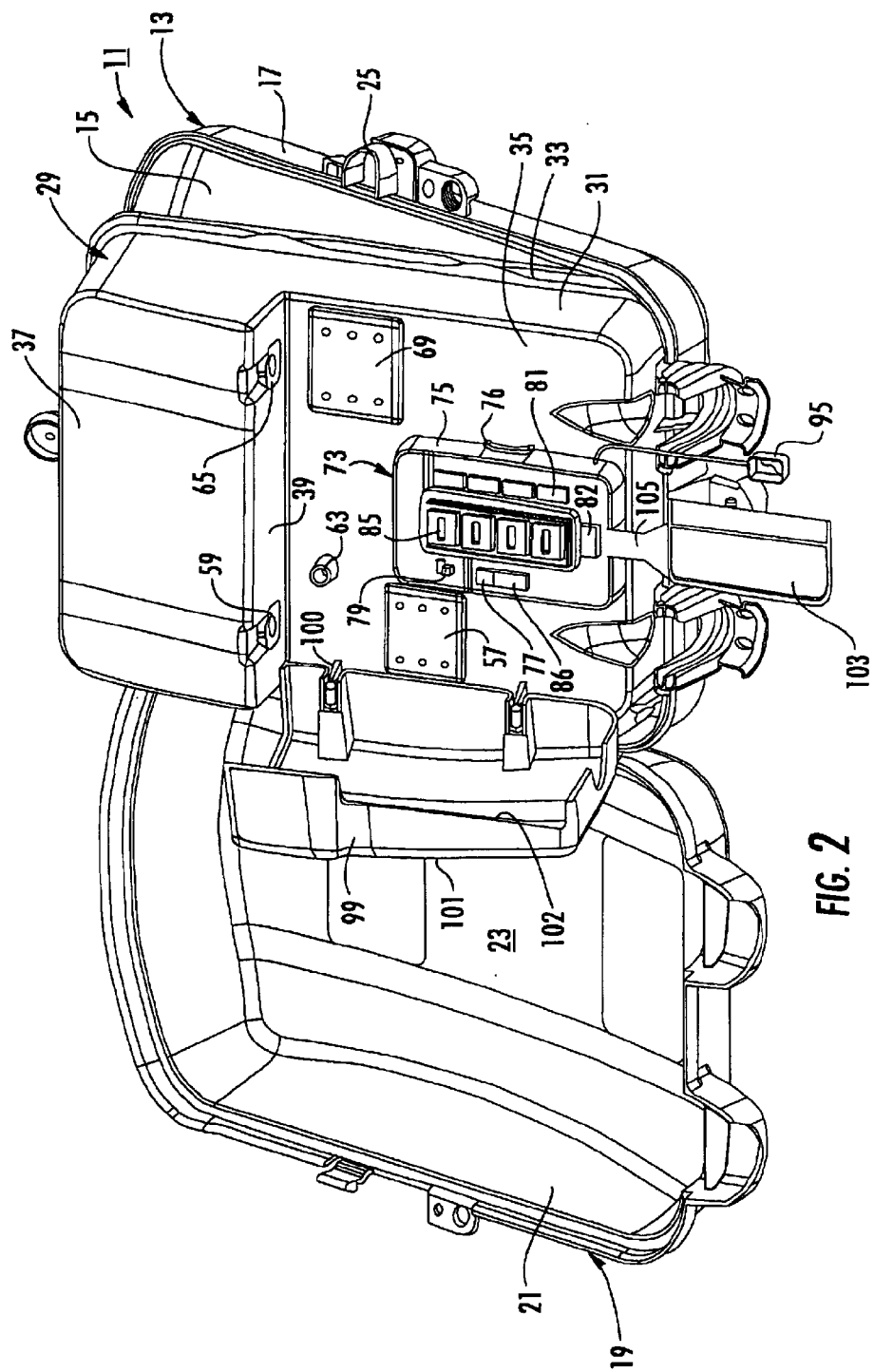
FIG. 2 is an isometric view of the NID of FIG. 1, with some of the components removed for clarity and with the shield being tilted forward from the base.
Figure 3:
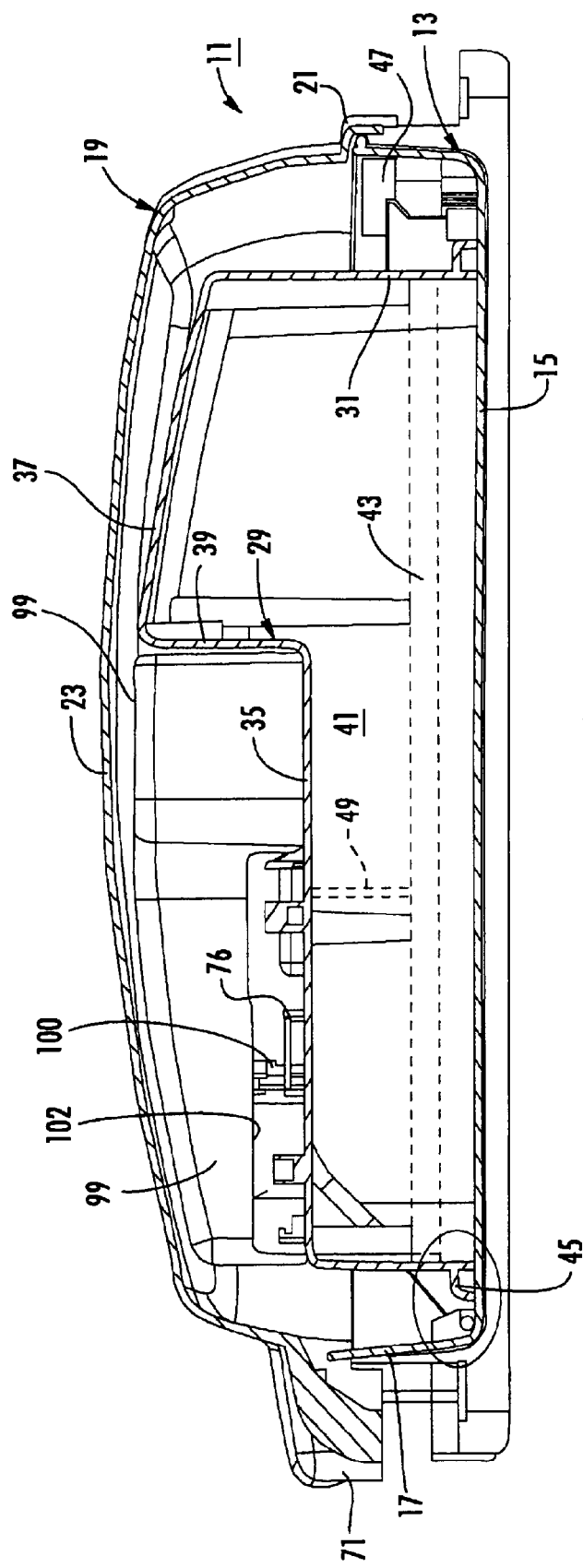
FIG. 3 is a sectional view of the NID of FIG. 1, taken along the line 3—3, but with the subscriber bridge module and the coaxial splitter of FIG. 1 removed.

Referring to FIGS. 1 and 2, NID 11 has a base 13 that is generally rectangular. Base 13 has a back wall 15 and a perimeter wall 17. The housing also includes an outer cover 19 that is connected by a hinge 20 (FIG. 1) to one side of perimeter wall 17. Outer cover 19 also has a perimeter wall 21 that meets and forms a closure with perimeter wall 17 to prevent moisture and elements from entering. Cover 19 has a top 23 that is generally convex, as shown in FIG. 3. A latch 25, having portions connected to perimeter wall 17 and to perimeter wall 21, will latch outer cover 19 in a closed position. As shown in FIG. 1, lugs 27 extend from base perimeter wall 17 for securing base 13 to a wall of a building or a conduit.

Referring still to FIG. 2, a security shield 29 locates in base 13. Shield 29 is preferably manufactured of a thermoplastic material and in the preferred embodiment does not need to provide shielding against electromagnetic signals. However, it could be made so as to provide such shielding if desired. Shield is a partition that has perimeter walls 31 that are substantially coextensive with base perimeter wall 17 on the sides and lower end so as to fit closely inside base perimeter wall 17. A wall tab 33 extends around the edge of perimeter walls 31 of shield 29 to accept a gasket for sealing. Shield 29 has a forward wall or platform that has a main level 35 and a raised level 37 separated by a bulkhead 39. As shown in FIG. 3, raised level 37 is at a greater distance from base back wall 15 than main level 35. A cavity 41 is located within shield 29 between base back wall 15 and the platform levels 35, 37. A PC board 43 mounts to the interior side of shield 29 within cavity 41. PC board 43 has components on it that will extend from PC board 43 into cavity 41 behind platform main level 35 and platform raised level 37. The circuitry of PC board 43 is commercially available and is not part of this invention. PC board 43 separates and routes signals between provider and subscriber.

Shield 29 has two hinges 45 on one end that allows it to tilt forward from base 13 about hinge 45 as shown in FIG. 2. A fastener 47 is located at the opposite end of shield 29 for securing the upper end of shield 29 to base 13. Fastener 47 is preferably of a type that utilizes for opening shield 29 a special tool not widely available. Retainers 48 are formed on base 13 for frictionally gripping tab 33 at two selected places on each side to further secure shield 29. Users are instructed not to open shield 29. Qualified personnel can readily remove shield 29 by loosening fastener 47, tilting the upper end forward and pulling shield 29 away from base 13. Hinge 45 readily releases from base 13 retainers 48 readily release tab 33.

As shown schematically in FIG. 3, a plurality of connector pins 49 extend from PC board 43 through apertures in shield platform main level 35. Connector pins 49 provide connections for power and for input/output signals as will be subsequently be described.

Referring now to FIG. 1, a provider cable 51 is adapted to be connected to NID 11. Provider cable 51 may be a pure coaxial type, having a single coaxial cable, or even a copper cable, such as a twisted-pair. Alternately, it may be of a composite type, having a coaxial cable bundled together with one or more twisted wire pairs. Twisted-wire pairs are commonly used for telephone voice communication and data communication, such as internet access, while coaxial cable is commonly used for cable television signals. Telephone voice and data signals are also delivered over coaxial cable. The active electronics of PC board 43 (FIG. 2) is adapted to receive multiple signals from a single cable, including multiple signals for voice, internet access, and cable television. The circuitry of PC board 43 processes these signals and delivers them to various subscriber lines leading to the particular equipment.

Provider cable 51 passes through a provider housing port 53, which is partially formed in base perimeter wall 17 and partially formed in cover perimeter wall 21. Provider port 53 has a grommet for sealing. A coaxial protector 55 may be mounted to platform main level 35 a short distance from provider housing port 53. Coaxial protector 55 is a conventional element. It will provide protection against excessive voltage, such as due to lightning strikes, diverting the excess voltage to a ground. Protector 55 may also have a fuse link to part in the event of excess current. Coaxial protector 55 preferably mounts on a pad 57, shown in FIG. 2, formed on and raised from platform main level 35. A coaxial port 59 is located on bulkhead 39 (FIG. 2). Coaxial port 59 receives the coaxial line from coaxial protector 55. The coaxial line leads to and is connected to the electrical components of PC board 43 (FIG. 3).

Also, a twisted-pair protector 61 may be mounted to platform main level 35. Twisted-pair protector 61 is of a conventional design for providing protection from excess voltage. It will conduct to a ground through its mounting receptacle 63 in the event of excess voltage, such as due to a lightning strike. Twisted-pair protector 61 is used only if provider cable 51 is of a composite type, having twisted-pairs as well as a coaxial wire. If it is a composite and if protection is not otherwise provided, the twisted-pairs of the provider cable 51 would lead to twisted-pair protector 61, while the coaxial cable would lead to coaxial protector 55. If composite cable is not utilized, twisted-pair protector 61 is not required.

Figure 4:
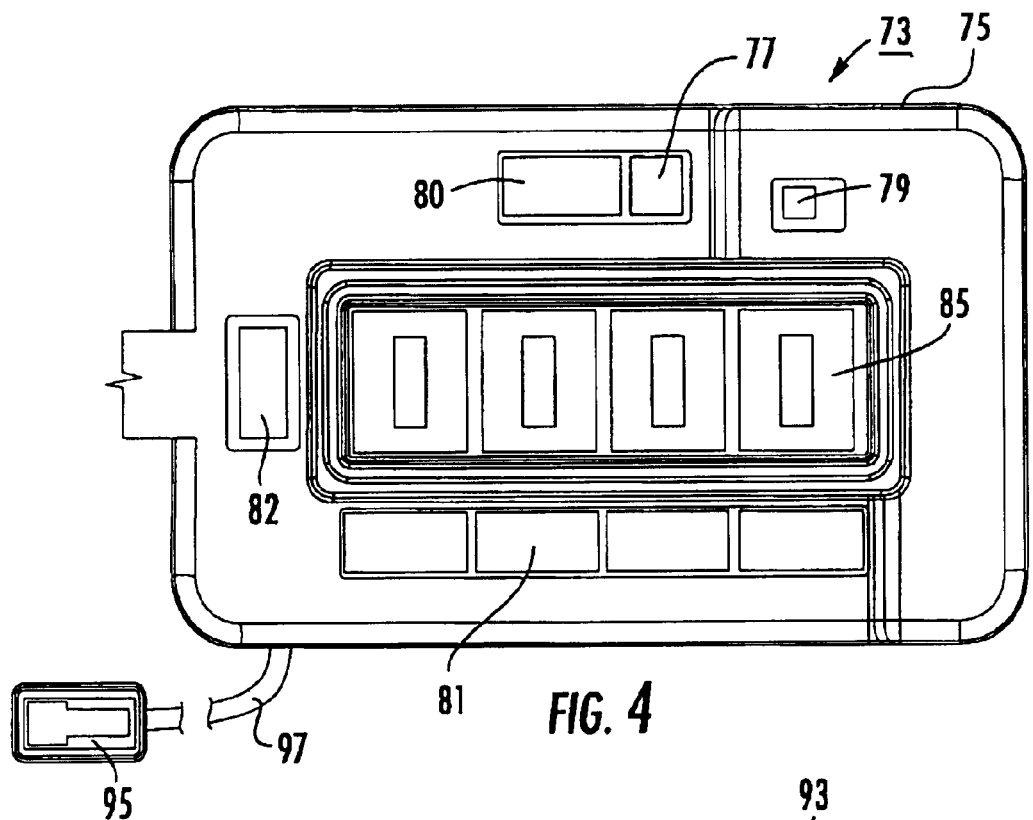
FIG. 4 is an enlarged front elevational view of the subscriber bridge module of the NID of FIG. 1.

A subscriber port 65 is also contained in bulkhead 39 (FIG. 2). Subscriber port 65 allows the passage of coaxial cable leading from PC board 43 (FIG. 3) to subscriber equipment that requires coaxial wiring. In this embodiment, a coaxial cable splitter 67 is shown connected to subscriber port 65. Splitter 67 is of a conventional type, splitting signals, such as for cable television, into different output ports. Coaxial splitter 67 may mount to a pad 69 (FIG. 2) formed on and raised above platform main level 35. Conventional coaxial cable, such as used for cable television, may pass through a housing subscriber port 71 for connection to the output pins of coaxial splitter 67. Housing subscriber port 71 is partially formed in base perimeter wall 17 and in outer cover perimeter wall 21 and contains a grommet for sealing. Referring to FIGS. 2 and 4, a subscriber bridge module 73 mounts to platform main level 35 of shield 29, approximately halfway between provider housing port 53 and subscriber housing port 71. Subscriber bridge module 73 has a housing 75 that secures to platform main level 35 by means of retainers 76. Power terminals 77 are located on the left side of subscriber bridge module 73. Power terminals 77 may be of various types, but are shown in this embodiment to be of a biased spring type. Power terminals 77 are connected to power wires for supplying power via connector pins 49 (FIG. 3) to printed circuit board 43. Power may be supplied from two alternate sources. In one type, power is supplied through the coaxial wire within the provider cable 51 (FIG. 1). In the other type, power is supplied from a wire in the provider cable 51 other than the coaxial wire. A switch 79 enables the provider's installer to properly select which source is providing power. Subscriber bridge module 73 may also have alarm and telemetry terminals 80 that connect to a backup power supply located in the dwelling, if one is used.

A plurality of subscriber termination points or terminals 81 and 82 are located on a side of bridge module 73 from power terminal 77. Four subscriber voice terminals 81 and one subscriber data terminal 82 are shown in this embodiment. Subscriber terminals 81, 82 may be of various types. In this embodiment, each is a biased spring type. Each is adapted to receive a number of twisted-pair subscriber wires 81 (FIG. 1) that lead from the dwelling through subscriber housing port 71 (FIG. 1). Preferably terminals 81 are for voice communication, while terminal 82 is for internet access.

Figure 5:
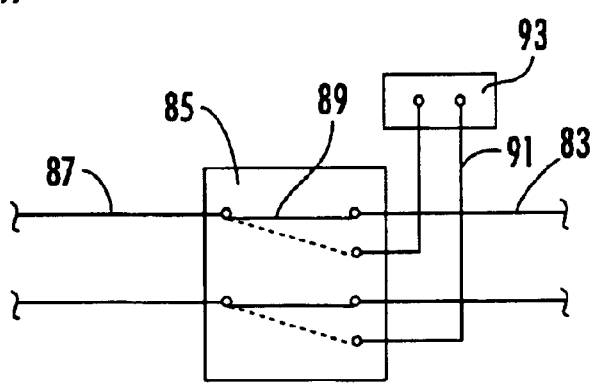
FIG. 5 is a simplified electrical schematic illustrating one of the jacks of the subscriber bridge module of FIG. 4.

A plurality of telephone jacks 85 are mounted between power terminal 77 and subscriber line terminals 81. One telephone jack 85 is associated with each subscriber voice terminal 81. Each telephone jack 85 has a receptacle for receiving a plug, normally an RJ-11 type, of a telephone receiver. As shown in FIG. 5, each telephone jack 85 has a switch 89 that is normally closed. In the closed position, each subscriber wire 83 connects to a line 87 that leads through connector pins 49 to the electronics of PC board 43 (FIG. 3). Communications from PC board 43 may be through coaxial protector 55 and provider line 51 (FIG. 1), if protection is needed and not on PC board 43. When a telephone plug is inserted into jack 85, it will cause switch 89 to move to the open position. This breaks the connection between subscriber wires 83 and provider lines 87. It allows a telephone receiver connected to the telephone plug to be connected directly to the provider line 87 leading to PC board 43, disconnecting it from subscriber lines 83. This allows one to determine whether a fault is occurring in the subscriber equipment or in the provider equipment, which includes PC board 43 (FIG. 3) and provider line 51 (FIG. 1). Because switches 89 are normally closed during operation, voltage may be present on subscriber terminals 81. It is possible that a subscriber may be installing a subscriber line 83 into one of the subscriber line terminals 81 (FIG. 4). To avoid the possibility of a shock, voltage should not be present on subscriber line terminals 81 at this time. As mentioned, subscriber terminals 81 are cut off from any power supplied through provider line 87 when a telephone receiver plug is inserted. However, the subscriber may not have a telephone handy at that moment. For convenience, a safety plug 95 is tethered to subscriber bridge module 73 by a flexible lanyard or link 97. Safety plug 95 is a passive plug, having no electrical contacts whatsoever. However, it has the overall configuration of a conventional plug for a telephone receiver. When pushed into one of the telephone jacks 85, it will physically cause switch 89 to open, providing a demarcation between subscriber lines 83 and provider lines 87. This avoids any voltage being present at the particular subscriber terminal 81 associated with that jack 85.

Referring again to FIG. 2, inner cover 99 is connected by hinge 100 to platform main level 35. Inner cover 99 partially covers platform main level 35. Inner cover 99 extends from bulkhead 39 to a lower portion of shield perimeter wall 31. Inner cover 99 extends from the left portion of shield perimeter wall 31 to the left edge of telephone jacks 85. Inner cover 99 has a convex top 101 that is substantially flush with platform raised level 37 while in the closed position. A recessed edge 102 on the right side of inner cover 99 accommodates the left portion of subscriber bridge module 73. While closed, inner cover 99 will enclose coaxial protector 55, provider coaxial port 59, twisted pair protector 61, if used, power terminals 70, alarm terminal 80 and switch 79. Preferably, inner cover 99 is secured in a manner that does not allow a subscriber to readily access these components. However, telephone jacks 85 subscriber wire terminals 81 and splitter 67 are accessible to a subscriber. Also, for additional protection, preferably a bridge cover or door 103 will snap over the various telephone jacks 85. Bridge door 103 is secured to subscriber bridge module 73 by a flexible link 105.

In operation, the provider installer will secure base 13 to a wall of the subscriber's dwelling by inserting fasteners through lugs 27 (FIG. 1). The installer will connect provider cable 51 to coaxial protector 55, and if twisted wires are present, connect them to twisted wire protector 61. The installer will set switch 79 and secure the connections for power terminal 77 and alarm terminal 80, if a backup power supply is used. Cover 99 is then secured in a closed position.

The subscriber's wiring may be handled by the provider installer or another person. Subscriber coaxial cable connects to splitter 67, if the splitter is used. Twisted-pair wiring 83 that leads to the subscriber's equipment, such as telephones or modems, connects to subscriber line terminals 81, 82. A person may test for a dial tone by inserting a conventional telephone plug into any of the telephone jacks 85 and listen for a dial tone through a receiver. Once complete and when everything is in working order, the installer closes door 103 as well as cover 19.

Signals from the provider cable 51 pass through coaxial protector 55, coaxial port 59 to PC board 43. PC board 43 splits and routes these signals, with cable television signals leading to splitter 67. Signals for twisted-pair equipment pass from PC board 43 through connector pins 49 (FIG. 3) to subscriber terminals 81, 82 (FIG. 2). The signals on the twisted-pair equipment may include various voice lines or data lines for internet usage.

If the subscriber wishes to check any of the twisted-pair lines 83 leading to his equipment or to install additional lines 83, he will open door 103 (FIG. 2) to expose jacks 85. To test, he will utilize a telephone receiver to insert into one of the jacks 85. This disconnects the subscriber lines 83 from the provider lines 87 (FIG. 5) to enable a direct call to be made on the provider lines 87 by the receiver. Alternately, if the subscriber is installing or changing twisted-pair lines 83 at terminals 81, the subscriber may insert safety plug 95 into one of the jacks 85, rather than use a plug of a telephone receiver. This breaks any voltage that may exist on any of the subscriber terminals.

The invention has significant advantages. By mounting the active electronics and PC board to a shield within the housing, if the malfunction occurs in the electronics, the shield can be readily removed from the housing, along with the PC board and bridge module. The repairman does not need to remove the housing, which is secured to the premise wall. The installer can readily replace the subassembly including the shield, PC board and bridge module. The safety plug allows a subscriber to easily remove any voltage at the subscriber line terminals by inserting the plug into one of the telephone jacks. The subscriber bridge module provides easy access to all of the necessary terminations. The inner cover protects against unwarranted access to provider portions of the NID.

While the invention has been shown in only one of its forms, it should be apparent to those skilled in the art that it is not so limited, but is susceptible to various changes without departing from the scope of the invention.

We claim:

1. A network interface device, comprising:

a housing having a base adapted to be connected to a structure and an outer cover hinged to the base;

a shield located within the housing, defining a cavity between the base and the shield to hold a printed circuit board having circuitry for controlling and routing telecommunication signals between a provider line and a subscriber line leading to subscriber equipment within the structure;

a provider line port in the shield for connecting the provider line to the printed circuit board;

a hinged inner cover mounted to the shield over the provider line port for blocking access to the provider line port, the inner cover being movable between open and closed positions; and a subscriber bridge module mounted on the shield, the subscriber bridge module having a subscriber line termination point adapted to be electrically connected with the subscriber line in the structure and a telephone jack adapted to be connected to the provider line and to the subscriber line termination point for providing a demarcation between the subscriber line and the provider line, the telephone jack and the termination point being positioned outside of the inner cover while the inner cover is in the closed position; and wherein while in a closed position, the outer cover of the housing encloses the shield inner cover, and subscriber bridge module.

2. The network interface device according to claim 1, further comprising a door hinged to the subscriber bridge module for releasably enclosing the jack, the door being positioned outside of the inner cover while the inner cover is in the closed position and being enclosed by the outer cover of the housing while the outer cover is in the closed position.

3. The network interface device according to claim 1, further comprising a safety plug configured to be received in the telephone jack for interrupting any voltage to the subscriber line termination point.

4. The network interface device according to claim 3, wherein the safety plug is secured by a flexible link to the subscriber bridge module.

5. The network interface device according to claim 1, wherein, the shield has a first level spaced a first distance from the base, a second level spaced a greater distance from the base than the first level and a bulkhead joining the first and second levels;

the provider line port is located in the bulkhead, and the subscriber bridge module is mounted on the first level; and the inner cover extends over a portion of the first level and has a portion substantially flush with a portion of the second level while the inner cover is in the closed position.

6. The network interface device according to claim 1, wherein the provider line comprises coaxial cable, and wherein the device further comprises:

a coaxial protector adapted to be electrically connected to the provider line, mounted to an exterior side of the shield and enclosed by the inner cover while the inner cover is in the closed position, the coaxial protector protecting against excess voltage.

7. The network interface device according to claim 1, further comprising:

a power terminal mounted to the subscriber bridge module for connection to a power line for supplying power to the printed circuit board; and wherein the inner cover encloses the power terminal while the inner cover is in the closed position.

8. The network interface device according to claim 1, wherein the shield has a platform spaced from the base and a perimeter wall surrounding the platform and extending form the platform toward the base, the perimeter wall being releasably fastened to the base.

9. A network interface device for a coaxial provider line, comprising:

a housing having a base adapted to be connected to a structure and an outer cover hinged to the base;

a shield located within the housing, defining a cavity between the base and the shield;

a coaxial protector for protecting against excess voltage mounted to an exterior side of the shield and adapted to be connected to a coaxial provider line;

a printed circuit board mounted to an interior side of the shield within the cavity, the printed circuit board having circuitry for routing telecommunication signals between the coaxial provider line and both twisted-pair line subscriber equipment and coaxial line subscriber equipment;

a subscriber bridge module mounted on the exterior side of the shield, the subscriber bridge module having a subscriber line termination point adapted to be electrically connected with a subscriber line in the structure and a telephone jack electrically connected to the termination point and to the printed circuit board, for providing a demarcation between the subscriber line and the provider line;

the shield being releasably fastened to the base so as to be removable along with the printed circuit board and subscriber bridge module for repair or replacement while the base remains secure to the structure;

a hinged inner cover mounted to the shield adjacent the coaxial protector and the provider port for enclosing the coaxial protector and provider port, the inner cover being movable between open and closed positions, the telephone jack and the subscriber line termination point being positioned outside of the inner cover while the inner cover is in the closed position; and wherein while in a closed position, the outer cover of the housing encloses the shield, inner cover, and subscriber bridge module.

10. The network interface device according to claim 9, wherein the shield is hinged to the base.

11. The network interface device according to claim 9, further comprising a door hinged to the shield for releasably enclosing the jack, the door being positioned outside of the inner cover while the inner cover is in the closed position and being enclosed by the outer cover of the housing while the outer cover is in the closed position.

12. The network interface device according to claim 9, further comprising a safety plug configured to be received in the telephone jack for interrupting any voltage to the subscriber line termination point, the safety plug being free of electrical components.

13. The network interface device according to claim 9, wherein the safety plug is secured by a flexible link to the subscriber bridge module.

14. The network interface device according to claim 9, wherein:

the shield has a first level spaced a first distance from the base, a second level spaced a greater distance from the base than the first level, and a bulkhead joining the first and second levels and wherein the network interface device further comprises:

a coaxial provider line port in the bulkhead for connecting to the coaxial provider line;

a coaxial subscriber line port in the bulkhead for connecting to the subscriber line;

wherein the coaxial protector and subscriber bridge module are mounted on the first level; and the inner cover encloses the coaxial provider line port and has a portion substantially flush with a portion of the second level while the inner cover is in the closed position.

15. The network interface device according to claim 9, further comprising;

a power terminal mounted to the subscriber bridge module for connection to a power line for supplying power to the printed circuit board; and wherein the power terminal is enclosed by the inner cover while the inner cover is in the closed position.

16. A network interface device for a provider line having coaxial cable, comprising:

a housing having a base adapted to be connected to a structure and an outer cover hinged to the base;

a subscriber bridge module mounted in the housing, the subscriber bridge module having at least one subscriber line termination point adapted to be electrically connected with a subscriber line and at least one telephone jack electrically connected to the termination point and adapted to be electrically connected with the provider line for providing a demarcation between the subscriber line and the termination point, the jack having a normally closed switch therein that electrically connects the provider line with the termination point; and a safety plug selectively insertable into the telephone jack for opening the switch to break electrical connection of the subscriber line with the provider line, the safety plug being a passive member free of any electrical wiring.

17. The network interface device according to claim 16, wherein the safety plug is tethered to the subscriber bridge module.

18. The network interface device according to claim 16, further comprising;

a shield located within the housing the shield having a platform and a perimeter wall extending around the platform, the perimeter wall being releasably fastened to the base, defining a cavity between the base and the platform;

a printed circuit board mounted to an interior side of the shield within the cavity, the printed circuit board having circuitry for routing telecommunication signals between the provider line an the subscriber line; and wherein the shield is removable from the base along with the printed circuit board.

19. The network interface device according to claim 16, further comprising a door hinged to the shield for releasably enclosing the jack, the door being enclosed by the outer cover of the housing while the outer cover is in the closed position.

20. The network interface device according to claim 19 wherein the door is attached to the subscriber bridge module by a flexible link.

21. A network interface device comprising:

a base;

an outer cover hinged to the base;

a subscriber bridge module mounted to the base, the subscriber bridge module having at least one subscriber line termination point adapted to be electrically connected with a subscriber line and at least one telephone jack electrically connected to the termination point and adapted to be electrically connected with a provider line to provide a demarcation between the subscriber line and the termination point;

a printed circuit board mounted to the base, the printed circuit board having circuitry for routing twisted-pair and coaxial telecommunication signals between the provider line and the subscriber line, a shield defining a cavity between the base and the shield to hold the printed circuit board;

a provider line port in the shield for connecting the provider line to the printed circuit board; and a hinged inner cover mounted to the shield over the provider line port for blocking access to the provider line port, the inner cover being movable between open and closed positions.

22. The network interface device according to claim 21 further comprising a door attached to the subscriber bridge module by a flexible link, the door being movable between an open position and a closed position to selectively cover the termination point and the telephone jack in the closed position.

* * * * *

UNITED STATES PATENT AND TRADEMARK OFFICE
CERTIFICATE OF CORRECTION

PATENT NO. : 6,795,552 B1
DATED : September 21, 2004
INVENTOR(S) : Andrew G. Stanush and Michael K. James It is certified that error appears in the above-identified patent and that said Letters Patent is hereby corrected as shown below:

Column 7,
Line 8, add -- , -- after "shield".

Column 9,
Line 36, delete "an" and substitute -- and --.

Signed and Sealed this

Twenty-eighth Day of December, 2004

JON W. DUDAS
*Director of the United States Patent and Trademark Office*